US012578356B2

(12) United States Patent
Vrankovic et al.

(10) Patent No.: US 12,578,356 B2
(45) Date of Patent: Mar. 17, 2026

(54) EMBEDDED VIBRATION AND SHOCK SENSOR WITH AN INTEGRATED MOTOR DRIVE ASSEMBLY

(71) Applicant: ROCKWELL AUTOMATION TECHNOLOGIES, INC., Mayfield Heights, OH (US)

(72) Inventors: Zoran Vrankovic, Greenfield, WI (US); Arun K. Guru, Brookfield, WI (US); Todd M. Oestreich, Cedarburg, WI (US); Theodore A. Rodriguez, Jr., Milwaukee, WI (US); Kristin N. Yee, Port Washington, WI (US); Jon P. Vanderpas, Appleton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 575 days.

(21) Appl. No.: 17/717,812

(22) Filed: Apr. 11, 2022

(65) Prior Publication Data

US 2023/0324432 A1     Oct. 12, 2023

(51) Int. Cl.
*G01P 15/00* (2006.01)
*H02K 5/10* (2006.01)
(Continued)

(52) U.S. Cl.
CPC ............... *G01P 15/00* (2013.01); *H02K 5/10* (2013.01); *H02K 7/003* (2013.01); *H02K 11/20* (2016.01)

(58) Field of Classification Search
CPC ...... G01P 15/00; G01P 15/001; G01P 15/003; G01P 15/097; H02K 11/20; H02K 5/10;
(Continued)

(56) References Cited

U.S. PATENT DOCUMENTS 5,726,911 A     3/1998  Canada et al.
6,289,735 B1    9/2001  Dister et al.
(Continued)

FOREIGN PATENT DOCUMENTS

CN      112491215 A    3/2021
DE    102018211838 A1  1/2020
JP      2020099165 A   6/2020

OTHER PUBLICATIONS

Extended European Search Report for EP Application No. 23166712.2, Mailed Sep. 5, 2023, 10 Pages.

*Primary Examiner* — Stephen D Meier
*Assistant Examiner* — Quang X Nguyen
(74) *Attorney, Agent, or Firm* — Fletcher Yoder, P.C.

(57) ABSTRACT

The present disclosure is directed to an integrated drive module assembly with vibration-based anomaly detection. The integrated drive module assembly may include a motor coupled to a drive module. The drive module may provide electric power to the motor for operation. Moreover, the drive module may provide control signals to control operations of the motor. The drive module may include an accelerometer and a processing circuit. The processing circuit may determine baseline vibration profiles of the motor during operation using the accelerometer. Subsequently, the processing circuit may determine anomaly conditions of the motor based on comparing the vibrations of the motor with the baseline vibration profiles. Accordingly, the integrated drive module assembly may facilitate performing counter-measures with low latency based on detecting the anomaly conditions using the accelerometer when the drive module is coupled to the motor.

20 Claims, 5 Drawing Sheets

(51) Int. Cl.
  *H02K 7/00*          (2006.01)
  *H02K 11/20*        (2016.01)
(58) Field of Classification Search
  CPC ...... H02K 7/003; G01M 7/022; G01M 7/025;
                                    G01M 7/08
  See application file for complete search history.

(56)                    References Cited

U.S. PATENT DOCUMENTS

| | | |
|---|---|---|
| 8,076,876 B2 | 12/2011 | Lundell |
| 8,212,514 B2 | 7/2012 | Campbell et al. |
| 8,851,381 B2 | 10/2014 | Lundell |
| 9,876,410 B2 | 1/2018 | Sauer |
| 10,488,282 B2 | 11/2019 | Guru et al. |
| 2009/0248326 A1* | 10/2009 | Greening ............. G01R 33/072 |
| | | 702/56 |
| 2010/0127602 A1 | 5/2010 | Rueggen et al. |
| 2017/0119510 A1* | 5/2017 | Tomori ................ A61C 17/225 |
| 2021/0296977 A1* | 9/2021 | Schmezer .............. H02K 5/225 |
| 2021/0341901 A1 | 11/2021 | Miklosovic et al. |

* cited by examiner

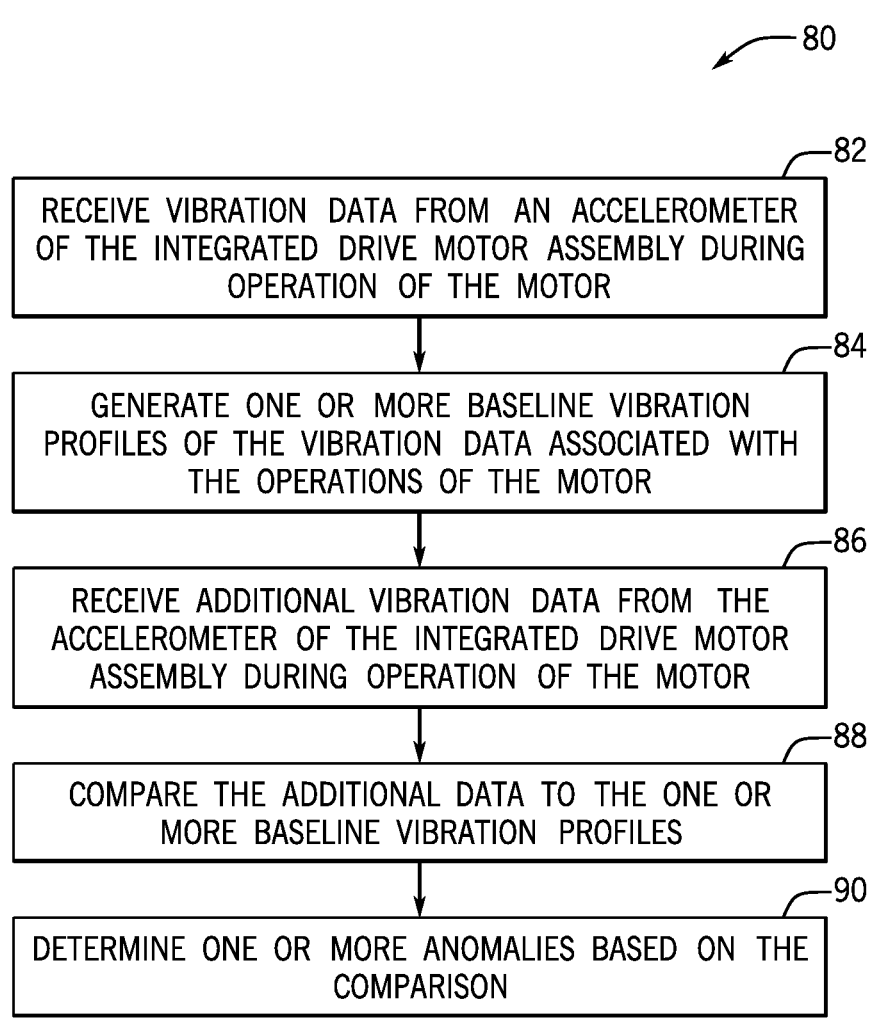

RECEIVE VIBRATION DATA FROM AN ACCELEROMETER OF THE INTEGRATED DRIVE MOTOR ASSEMBLY DURING OPERATION OF THE MOTOR

GENERATE ONE OR MORE BASELINE VIBRATION PROFILES OF THE VIBRATION DATA ASSOCIATED WITH THE OPERATIONS OF THE MOTOR

RECEIVE ADDITIONAL VIBRATION DATA FROM THE ACCELEROMETER OF THE INTEGRATED DRIVE MOTOR ASSEMBLY DURING OPERATION OF THE MOTOR

COMPARE THE ADDITIONAL DATA TO THE ONE OR MORE BASELINE VIBRATION PROFILES

DETERMINE ONE OR MORE ANOMALIES BASED ON THE COMPARISON

FIG. 4

EMBEDDED VIBRATION AND SHOCK SENSOR WITH AN INTEGRATED MOTOR DRIVE ASSEMBLY

BACKGROUND

The present disclosure relates generally to drive modules, and more particularly, to drive modules for use in a motor-drive system, which may be part of an industrial automation system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A wide range of systems in industry and other applications utilize automated control by actuating loads, such as electric motors. In motor-drives, for example, sophisticated control circuitry allows for implementation of control schemes that produce variable frequency output to drive motors at desired speeds. The motor-drives may be designed around individual packages, based on the power output of the motor or frame size, that can be programmed and wired to receive input power as well as to output conditioned power to the electric motor. Such packaged products typically include power condition circuitry that receives alternating current (AC) input voltage and converts the AC input voltage to a direct current (DC) voltage, before reconverting the DC voltage to controlled frequency AC voltage output. However, many products are designed to power specific sizes of motors (typically rated by the power output and/or frame size) and may only interface with a single size of motor. Accordingly, customers may have limited flexibility in using an existing motor-drive with different sized motors. Further, manufacturers and vendors of industrial automation systems may keep a larger inventory of motor-drives on hand to be compatible with a range of motor sizes. As such, motor-drives being designed to be compatible with specific motor sizes may result in increased cost, limited flexibility, and inventory-related inefficiencies.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an integrated drive module assembly is described. The integrated drive module assembly may include a first housing and a second housing. The first housing may include a motor. Moreover, the first housing may be coupled to the second housing. The second housing may include a power circuit board that may provide one or more voltages to the motor. The second housing may also include a control circuit board and a potting material. The control circuit board may include at least one processor configured to control one or more operations of the power circuit board. The control circuit board may also include an accelerometer configured to detect a first set of vibrations. The potting material may surround the power circuit board and the control circuit board within the second housing. Accordingly, the first set of vibrations may be detected by the accelerometer matches the vibrations of the motor, based on the potting material bonding the control circuit to the second housing.

In another embodiment, a method is described. The method may include receiving a first set of vibration data of a motor of an integrated drive motor assembly by a processor of the integrated drive motor assembly. The first set of the vibration data of the motor is received by the processor from an accelerometer of the integrated drive motor assembly during a first period of time. The method may also include generating one or more baseline vibration profiles based on the first set of vibration data by the processor. The method further includes receiving a second set of vibration data of the motor from the accelerometer during a second period of time after the first period of time by the processor. The motor is operating during the second period of time. The method further includes comparing the second set of vibration data with the one or more baseline vibration profiles by the processor. The method may also include determining one or more anomalies (e.g., faults) based on the comparison by the processor.

In another embodiment, a method of manufacturing an integrated drive module assembly with vibration based anomaly detection is described. The method includes assembling a control circuit in a first housing of the integrated drive module assembly. The control circuit may include a processor and an accelerometer to detect vibrations. The method also includes potting, using potting material, the first housing to bond the control circuit with an interior of the first housing. The method may also include coupling the first housing to the second housing via an adapter. The second housing includes a motor that may operate to move a load. As such, the accelerometer may detect vibrations of the motor via the second housing and the potting material. The potting material may reduce vibrations of the accelerometer relative to the second housing.

DRAWINGS

These and other features, aspects, and advantages of the present disclosure will become better understood when the following detailed description is read with reference to the accompanying drawings in which like characters represent like parts throughout the drawings, wherein:

FIG. 4 is a flowchart of a process for providing an indication of high vibrations and/or shocks of a motor of the integrated drive module assembly to a supervisory controller, in accordance with embodiments described herein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. As used herein, "in-line" refers to a longitudinal axis of a drive module or a component of a drive module arranged parallel with a rotational axis of a rotor of a motor. As used herein, "potting" refers to covering electronic components (e.g., circuitry) and/or filling an assembly containing electronic components with a solid or gelatinous material to prevent adverse environmental factors (e.g., water, moisture, corrosion, and so forth) and/or adverse effects from physical forces (e.g., impacts, shocks, vibrations, and so forth). As used herein, "power conversion" refers to converting alternating current into direct current, converting direct current into alternating current, altering a voltage of a current, or altering a frequency of a current, or any combination thereof.

Figure 1:
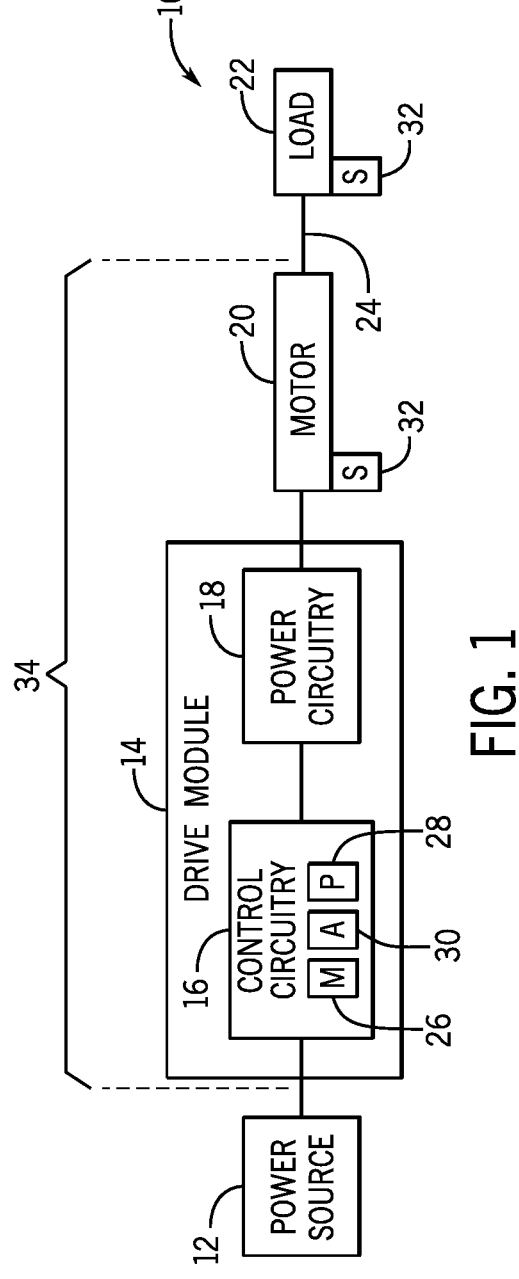
FIG. 1 is a perspective view of an industrial automation system, in accordance with embodiments described herein.

By way of introduction, FIG. 1 is a perspective view of an industrial automation system 10. The industrial automation system 10 may include a power source 12, a drive module 14, which includes control circuitry 16 (e.g., a controller board) and power circuitry 18 (e.g., a power board), a motor 20, and a load 22. The control circuitry 16, which may be used to control operations of the drive module 14, may include various subcomponents, such as a non-transitory memory 26, a processor 28, an accelerometer 30, a user interface, and the like. The drive module 14 may also include various subcomponents, such as a rectifier, an inverter, driver circuitry, one or more switches, etc., that may be used to control the operation of the motor 20. In the instant embodiment, the industrial automation system 10 may include one or more drive modules 14 coupled to respective motors 20, which are then coupled to one or more loads 22 via a connection 24.

In some cases, the motor 20 (or some component associated with the motor) may be provided with an encoder or a similar device to provide feedback data to the drive module 14. For example, the encoder measures the angular position of the motor shaft, from which velocity and acceleration data may be derived, to provide the feedback data to the drive module 14. In certain motors and associated control circuitry, this information may be estimated for "sensorless" control. Where such information is measured or estimated, the system may be controlled to implement a closed-loop velocity control regime, a torque-control regime, or other known techniques to track the desired motion and/or load profile of the application. For example, the drive module 14 may adjust the power output to the motor 20 (e.g., the frequency of the drive signals), thereby controlling its speed, based on the signal from the encoder 20.

The power circuitry 18 may be designed for any suitable power rating. The power circuitry 18 may receive three-phase power and output three-phase power for operation of the motor 20. For example, the power circuitry 18 may include any number of components, such as rectifiers, inverters, converters, switches, and so forth that may receive three-phase AC power, may rectify the three-phase AC power to DC power (e.g., a DC voltage waveform), and may invert and may generate a three-phase output AC power waveform at a desired frequency for actuating the motor 20 connected to the drive module 14. Moreover, the power circuitry 18 may be configured to condition the power signal output. For example, the power circuitry 18 converts a signal from alternating current (AC) to direct current (DC), convert a signal from DC to AC, step a signal up, step a signal down, and the like. In some cases, the processor 28 of the control circuitry 16 may control switching frequency or firing angles of one or more switching devices (e.g., IGBTs, transistors) that are disposed on the power circuitry 18. The changes to switching frequency may adjust or modify the AC voltage waveforms, phase shifts between the AC voltage waveforms, and other properties associated with the AC voltage waveforms provided to the motor 20 within a motor housing.

The power source 12 may supply a regular voltage or high voltage AC signal provided by a utility power grid (e.g., a standard electrical outlet), a battery, a capacitor, a generator, or some other source of AC or DC electrical power. However, it should be understood that many possible embodiments are envisaged. For example, the control circuitry 16 may include various components that may output one or more control signals (directly or indirectly) to the motor 20 or actuator to cause the motor to operate. For example, the motor may operate to move (e.g., spin, rotate, etc.) a shaft. The processor 28 of the control circuitry 16 may provide the control signals based on data acquired from the accelerometer 30, the non-transitory memory 26, or both.

The motor 20 may have mechanical and/or electrical components and may include a linear motor, a servo, a rotational electric motor, a combustion engine, a trolley, a mover, or any other component configured to move in response to a control signal. The motor 20 may be disposed within a separate housing (e.g., the motor housing) as compared to the drive module 14, such that the two housings may be coupled directly to each other or via an adapter module or housing element. The load 22 may be any load that is moved by the motor 20. In some embodiments, the industrial automation system 10 may include sensors 32 disposed on the motor, on the load 22, or both. The sensors 32 may be in communication with the control circuitry 16 (e.g., the processor 28) of the drive module 14. For example, the control circuitry 16 may generate the control signals based on receiving the measurements from the sensors 32.

The drive module 14 may include circuitry designed for starting, driving, braking, actuating, and performing any other suitable control operations for the motor 20. The circuitry may be designed for any suitable power rating, often referred to by the frame size, of the motor. For example, the processor 28 of the control circuitry 16 may monitor functions and coordinate operations of the motor 20. The drive module 14 and the motor 20 may communicate using a network connection according to any suitable connection protocol, such as standard industrial protocols, Ethernet protocols, Internet protocols, wireless protocols, and so forth.

The processor 28 typically carries out predefined control routines, or those defined by an operator, based upon parameters set during commissioning of the equipment and/or parameters sensed and fed back to the control circuitry 16 during operation of the motor 20. The control circuitry 16 may include an interface to transfer control, feedback, and other signals to the motor 20 and/or external devices. Many different control schemes and functions may be implemented by the control circuitry 16. Programs for some of the operations may be stored on a non-transitory computer-readable medium (e.g., the non-transitory memory 26).

With the foregoing in mind, the drive module 14 and the motor 20 may be assembled (e.g., coupled) in one piece as an integrated drive motor assembly 34. The integrated drive motor assembly 34 may include the drive module 14 and the motor 20 coupled via an adapter. In some cases, the integrated drive motor assembly 34 may be assembled in one enclosure or housing during manufacturing to include the drive module 14 and the motor 20. In addition, the integrated drive motor assembly 34 may be assembled after manufacturing to include the drive module 14 and the motor 20 in one enclosure or housing. In such cases, the drive module 14 of the integrated drive motor assembly 34 may move (e.g., vibrate) consistently with the movements of the motor 20 based on the drive module 14 and the motor 20 being coupled together.

The integrated drive motor assembly 34 may operate under the control of the control circuitry 16. As such, the control circuitry 16 may monitor the operations of the power circuitry 18 and the motor 20 based on receiving collected data (e.g., vibrations, voltages, speeds, temperatures, pressures, and so forth) from any number of sensors. For example, the accelerometer 30 may provide vibration and/or shock data of the motor 20 to the processor 28.

Moreover, the control circuitry 16 may control operations of the power circuitry 18 and the motor 20 based on the vibration data. In some cases, the control circuitry 16 may send the control signals to the power circuitry 18 and/or the motor 20 based on processing the vibration data. For example, the control signals may cause switches of the power circuitry 18 to open when detecting an anomaly (e.g., a high vibration of the motor 20), thereby removing power to the motor 20 to prevent damage.

Moreover, in specific cases, the processor 28 of the control circuitry 16 may determine movements or vibrations of the motor 20 using the accelerometer 30. For example, the processor 28 may determine various vibration and/or shock profiles of the motor 20 based on operational data related to the motor 20 and the corresponding vibration patterns measured by the accelerometer 30. The processor 28 may store the vibration profiles on the non-transitory memory 26 or transmit the vibration profiles to other components of the industrial automation system 10 for storage and/or processing.

Figure 2:
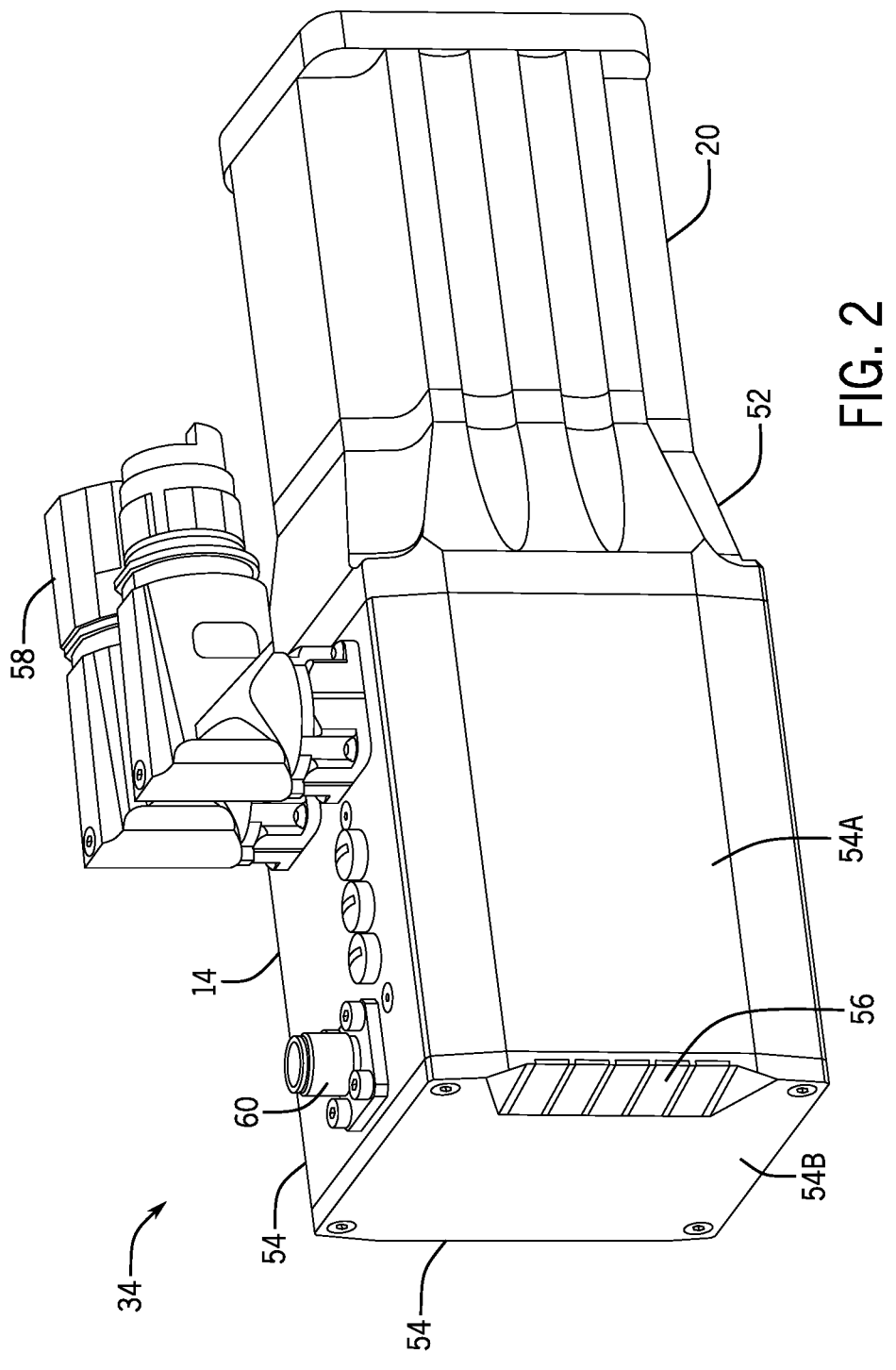
FIG. 2 is a perspective view of an integrated drive module assembly of the industrial automation system of FIG. 1, in accordance with embodiments described herein.

FIG. 2 illustrates an example integrated drive motor assembly 34. The depicted integrated drive motor assembly 34 includes the drive module 14 and the motor 20 discussed above. As mentioned above, in some cases, the drive module 14 and the motor 20 of the integrated drive motor assembly 34 may be coupled to each other using an adapter 52. The drive module 14 may actuate the motor 20 at controlled speeds. The drive module 14 may regulate output of the motor 20 in terms of speed, torque, power, or a combination of such parameters.

In a practical application, the motor 20 would be coupled to a load, such as the load 22 discussed above, to be driven to carry out industrial automation tasks (e.g., a pump, a conveyor, transmission equipment, and so forth). As will be appreciated by those skilled in the art, in many applications, the integrated drive motor assembly 34 may inter-operate with other machines, robots, conveyers, control equipment, and so forth (not separately shown) in an overall automation, packaging, material handling or other application.

The integrated drive motor assembly 34 may be part of an industrial automation system, such as the industrial automation system 10, to automate groups of tasks. For example, the integrated drive motor assembly 34 may automate manufacturing, material handling, mining, food processing, oil and gas extraction, refining, chemical processing, or any other useful application. Further, the industrial automation system may be physically and/or communicatively coupled with other systems by networks, both wired and wireless, at a single location or at dispersed locations in an organization.

The integrated drive motor assembly 34 may receive three-phase power and/or direct current power from a power source (e.g., the power source 12), such as an electrical grid, a battery, a generator, etc. The integrated drive motor assembly 34 may also convert fixed frequency input power from the power source to controlled frequency output power. As such, the integrated drive motor assembly 34 may manage application of electrical power to the loads (e.g., the load 22). The loads may include various machines or motors.

In the depicted embodiment, the drive module 14 may collect vibration data of the motor 20 based on being coupled to the motor 20 via the adapter 52. The drive module 14 may use the accelerometer 30 to collect the vibration and/or shock data. The drive module 14 may use the vibration data for monitoring and controlling functions of the motor 20. For example, the drive module 14 may determine anomalies of the integrated drive motor assembly 34 based on detecting outlier vibration data of the motor 20. Moreover, the drive module 14 may provide the control signals to adjust operations of the motor 20 based on the vibration data (e.g., detecting the anomalies). Additionally, the drive module 14 may also collect other data such as current, voltage, speed, rotational velocity, temperatures, pressures, and so forth. This other collected data may be correlated or matched with the collected vibration data to track operational characteristics of the drive module 14 with respect to the detected vibration data. That is, changes in the vibration data may correspond to direct correlations with other data changes. In this way, the vibration data may be used to determine or predict whether other aspects or operational characteristics are changing.

The integrated drive motor assembly 34 may include a housing 54. The housing 54 may include any number of portions, such as body portion 54A and end cap portion 54B. The body portion 54A may have an interior cavity that houses drive circuitry. In particular, the body portion 54A may include the control circuitry 16 and the power circuitry 18 for starting, driving, braking, actuating, sensing (e.g., collecting vibration data), and any suitable control of the motor 20. In particular, the control circuitry 16 may be assembled in the body portion 54A using any viable connector (e.g., bearings). The end cap portion 54B may be located at a first end of the body portion 54A and may be coupled to the body portion 54A (e.g., via fasteners, snaps, adhesives, etc.).

In some embodiments, the end cap portion 54B may be formed of a metal material, molded plastic, etc. For example, the end cap portion 54B may include a user interface 56. The user interface 56 may include one or more illuminating indicators, actuatable buttons or knobs, a display, a human-machine interface (HMI), and so forth, that may provide an indication of an operational state (e.g., on, off, starting, braking, fault, and so forth) of the drive module 14 and the motor 20. In certain embodiments, the user interface 56 may include any suitable type of display, such as any number of light emitting diodes (LEDs), a liquid crystal display (LCD), plasma display, and so forth. For example, the LEDs may illuminate in particular colors to provide an indication to a user of the operational state of the drive module 14 and the motor 20. Additionally, the user interface 56 may include a touch-sensitive mechanism (e.g., a touch screen) that may serve as part of a control interface for the integrated drive motor assembly 34.

The integrated drive motor assembly 34 may also include any number of data and/or power interfaces, such as hybrid connectors 58, coupled (e.g., mounted, fastened, and so forth) to the housing 54 of the drive module 14. The hybrid connectors 58 may enable data communication between the integrated drive motor assembly 34 and external devices (e.g., another drive module, a power interface module, and so forth). The hybrid connectors 58 may also transfer power between the integrated drive motor assembly 34 and the external devices (e.g., another drive module, a power interface module, and so forth).

For example, the hybrid connectors 58 may include an Ethernet interface to communicate via various industrial data exchange protocols. The Ethernet capability allows the integrated drive motor assembly 34 to be integrated into an Ethernet/IP infrastructure of an industrial automation system. The communication may follow any desired protocol, such as Ethernet/IP, DeviceNet, high speed drive serial interface (HSDSI), Modbus, and so forth. The hybrid connectors may also provide DC and/or AC power transfer.

In the depicted embodiment, the drive module 14 may include any number of input/output (I/O) ports, such as I/O port 60. The I/O port 60 may be a communication interface and may couple to other peripheral components such as input devices (e.g., keyboard, mouse, and so forth), sensors, I/O modules, and so forth. For example, a connected I/O module may permit the drive module 14 to communicate or interact with other devices in the industrial automation system. The drive module 14 may use the control circuitry 16 to communicate or interact with other devices in the industrial automation system.

The integrated drive motor assembly 34 may also include a housing extension (e.g., the adapter 52). The adapter 52 may be coupled to the housing 54 at an opposite end from the end cap portion 54B. The adapter 52 may couple the housing 54 to the motor 20. The adapter 52 may be coupled to the housing 54 at a first end and may be coupled to the motor 20 at a second end, opposite of the first end, such that the adapter 52 is disposed between the housing 54 and the motor 20.

For example, the adapter 52 may couple the body portion 54A of the housing 54 to a rotational axis of the shaft of the motor 20 in parallel with the longitudinal axis of the housing 54. Additionally, the rotational axis of the motor shaft may be aligned with the longitudinal axis of the housing 54. In different embodiments, the adapter 52 may be shaped differently according to a particular frame size of the motor 20. In any case, the adapter 52 provides an interface to couple the drive module to the motor 20.

Moreover, the integrated drive motor assembly 34 may use the control circuitry 16, positioned inside the housing 54, to collect the vibration data of the motor 20 since the adapter 52 physically couples the drive module 14 with the motor 20. As such, the accelerometer 30 of the drive module 14 may detect vibrations of the motor 20 based on the adapter 52 connecting the drive module 14 with the motor 20. The drive module 14 may use the processor 28 and the accelerometer 30 to collect the vibration data and/or shock data of the motor 20. The drive module 14 may use the received vibration data to determine the control signals that may be sent to the power circuitry 18 and/or the motor 20.

Furthermore, in some embodiments, the housing 54 may be filled (e.g., partially filled, fully filled) with potting material (e.g., silicone-based potting compound, sealant, or any other viable potting materials) to bond the control circuitry 16 and the housing 54 together. In such embodiments, the accelerometer (e.g., the accelerometer 30) of the drive module 14 may vibrate with the motor 20 based on the movement of the adapter 52 coupling the drive module 14 with the motor 20. Moreover, the potting material that bonds the housing 54 to the control circuitry 16 may transfer the vibrations of the motor 20 and the adapter 52 to the accelerometer 30. Accordingly, the processor 28 of the drive module 14 may monitor the vibrations of the motor 20 based on vibrations detected by the accelerometer 30.

Figure 3A:
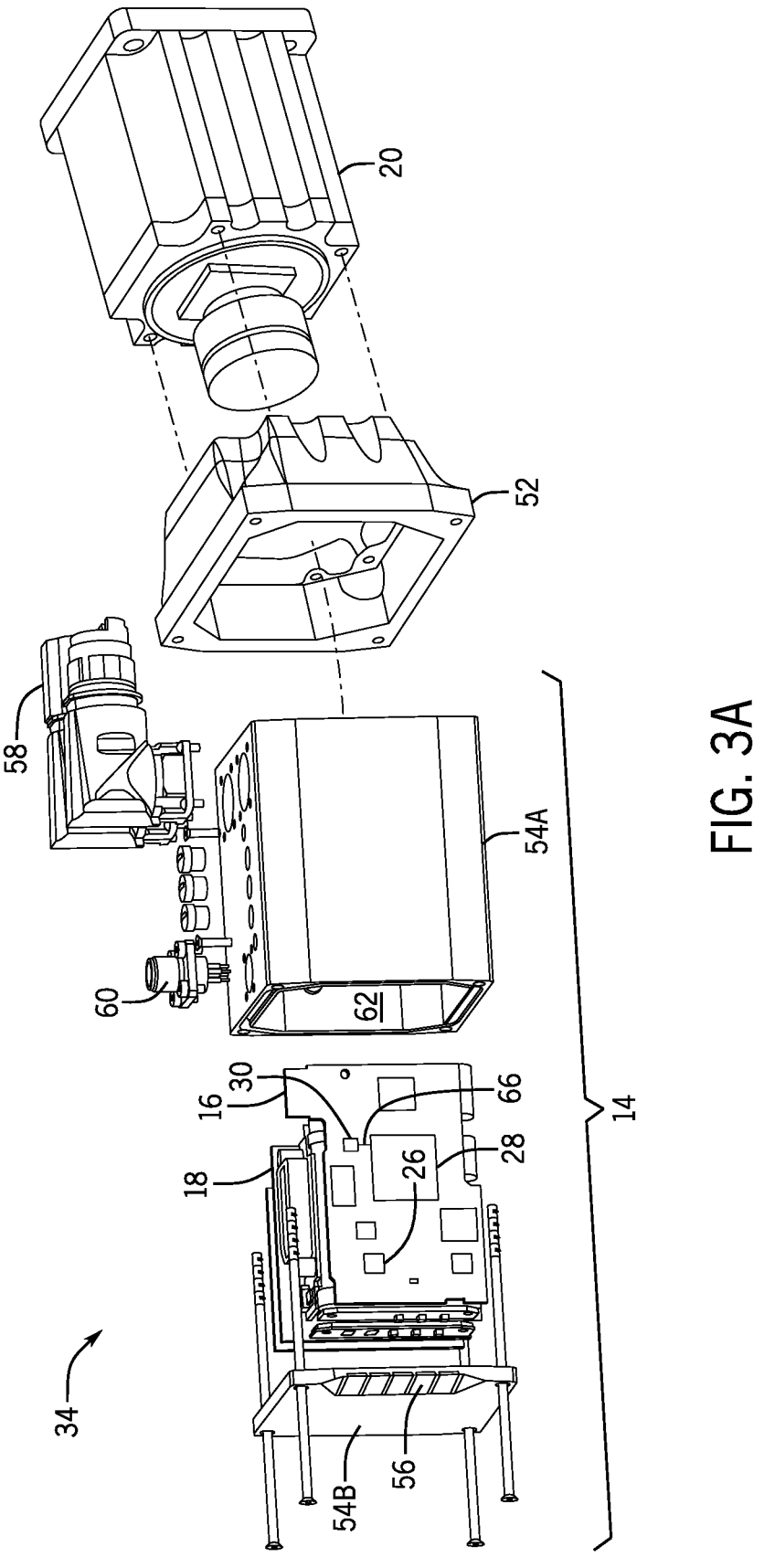
FIG. 3A is an exploded view of the integrated drive module assembly of FIG. 2, in accordance with embodiments described herein.

FIG. 3A illustrates an exploded view of the integrated drive motor assembly 34. The housing 54 may include an interior cavity 62. The cavity 62 may extend along a length of the body portion 54A. For example, the cavity 62 may extend from a first end adjacent the end cap portion 54B to an opposite end adjacent the adapter 52. The end cap portion 54B may couple to the body portion 54A at the first end and may cover an opening of the body portion 54A to enclose the cavity 62. The cavity 62 may include any number of circuit boards including the control circuitry 16 and the power circuitry 18. In the depicted embodiment, the non-transitory memory 26, the processor 28, and the accelerometer 30 may be positioned on the control circuitry 16.

The control circuitry 16 and the power circuitry 18 may be coupled to the body portion 54A and/or the end cap portion 54B via any number of fasteners. As mentioned above, in some embodiments, the cavity 62 of the housing 54, including the control circuitry 16, may be potted. In different cases, the cavity 62 may be partially or fully filled with potting material to bond the control circuitry 16 with the body portion 54A and/or the end cap portion 54B. As such, potting the cavity 62 may reduce or prevent vibrations of the accelerometer 30 disposed on the control circuitry 16 relative to the housing of the motor 20. Instead, the accelerometer 30 and the control circuitry 16 may move or vibrate at the same frequency or consistent with the vibrations of the motor 20 of the integrated drive motor assembly 34 during operation. That is, the potting material may limit the vibrations that may be created from sources other than the vibrations of the motor 20.

In some embodiments, the accelerometer 30 may sample the vibrations and provide the vibration data to the processor 28. For example, the accelerometer 30 may provide the vibration data to the processor 28 via a trace 66 or some other electrical connection. In some embodiments, the accelerometer 30 may provide one or more analog or digital signals indicative of the detected (e.g., sensed) vibrations to the processor 28. For example, the accelerometer 30 may provide the one or more analog signals to the processor 28 via the trace 66. In such cases, the processor 28 may sample the received analog signal to determine the vibration data. In any case, the processor 28 may receive the vibration data (e.g., determine the vibration data) with low latency (e.g., 1 nanosecond, 2 nanoseconds, 5 nanoseconds, 10 nanoseconds, and so on, 1 microsecond, 2 microseconds, 5 microseconds, 10 microseconds, and so on) based on the relatively close distance between the processor 28 and the accelerometer 30, as opposed to the accelerometer 30 being positioned on the motor 20 or away from the processor 28.

Figure 3B:
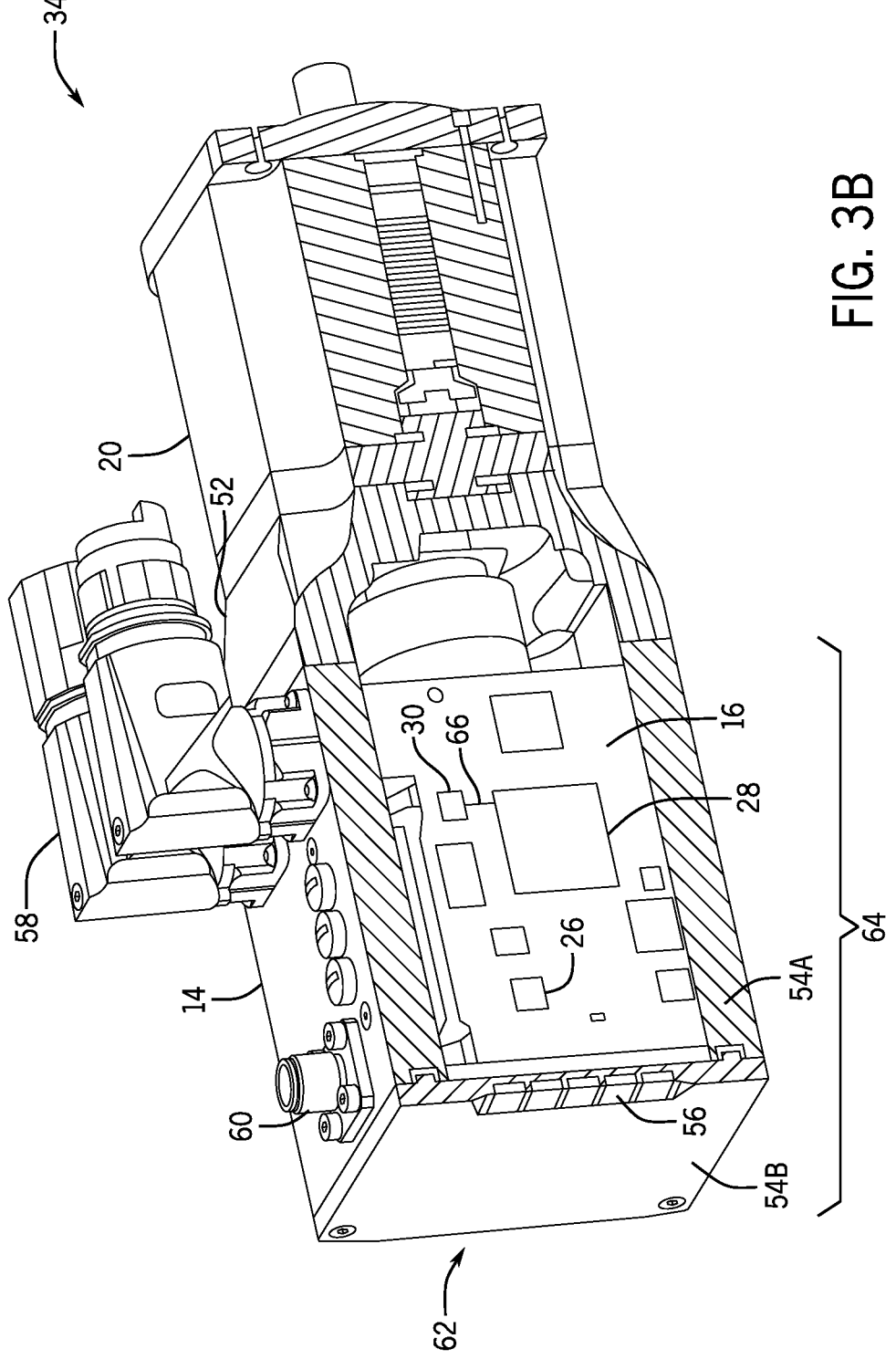
FIG. 3B is a perspective view of the integrated drive module assembly of FIG. 2 with transparent side view, in accordance with embodiments described herein.

FIG. 3B illustrates the integrated drive motor assembly 34 with a transparent side view of the body portion 54A. In the depicted embodiment, a transparent side view of the adapter 52 is also illustrated. It should be appreciated that in different embodiments, a different adapter 52 may couple the drive module 14 to the motor 20. In any case, in the depicted embodiment, the housing 54 may be filled (e.g., partially filled, fully filled) with potting material to bond the control circuitry 16 and the housing 54. A potted area 64 is shown for bonding the control circuitry 16 and the housing 54 of the drive module 14 inside the cavity 62.

In other embodiments, the potting material of the potted area 64 may partially or fully fill the cavity 62 to bond the control circuitry 16 with the body portion 54A and/or the end cap portion 54B. Accordingly, the potted area 64 may reduce (or prevent) vibrations of the control circuitry 16 and the accelerometer 30 that may be related to the coupling of the control circuitry 16 to the body portion 54A and/or the end cap portion 54B or other couplings. As such, the accelerometer 30 of the control circuitry 16 may detect (e.g., only detect) vibrations and/or shocks of the motor 20 of the integrated drive motor assembly 34 during operation.

FIG. 4 illustrates a flowchart of a process 80 for providing an indication of vibrations of the motor 20 that exceed a threshold or an expected vibration level to a supervisory controller. For example, the supervisory controller may include the processor 28 of the drive module 14 in FIG. 1, an external controller positioned outside the integrated drive module assembly, or any other viable processing circuitry. With this in mind, although the following description of the process 80 is described as being performed by the processor 28 in a particular order, it should be noted that the process 80 may be performed by other suitable computing devices and in any suitable order.

At block 82, the processor 28 may receive vibration data and/or shock data (e.g., first set of vibration data) from the accelerometer 30. For example, the processor 28 may receive the vibration data and/or shock data during operation of the motor 20 or when the motor is not operating. The vibration data may include analog or digital data indicative of the detected vibrations. In some cases, the processor 28 may associate or track the vibration data to a time in which the vibration data was acquired. The time data may be correlated to the operation of the motor 20. In additional, the processor 28 may transform the vibration data to the frequency domain and associate the determined frequency responses to times corresponding to the operations of the motor 20. As such, the processor 28 may associate (e.g., synchronize) the vibration data (e.g., time-series and/or frequency domain vibration data) to one or more operation characteristics of the motor 20. The operation characteristics of the motor 20 may include a spinning speed of a rotor/shaft of the motor 20, a position of the rotor/shaft, a spinning direction of the rotor/shaft, and so on.

At block 84, the processor 28 may generate one or more baseline vibration profiles based on the collected vibration data and/or shock data. Although embodiments herein are described with respect to vibration data and vibration profiles, it should be appreciated that the described embodiments may alternatively or additionally include shock data and shock profiles. For example, the accelerometer 30 may detect shocks and provides shock data as well as detecting the vibrations and providing the vibration data.

The processor 28 may generate the baseline vibration profiles by associating (e.g., synchronizing, correlating) the vibration data (e.g., time-series and/or frequency domain vibration data) with different times and/or modes of operations (e.g., operation characteristics) of the motor 20. For example, the processor 28 may store the one or more baseline vibration profiles using the non-transitory memory 26 that correspond to one or more operation modes. In some embodiments, generating a baseline vibration profile may include a learning period. The learning period for generating a baseline vibration profile may correspond to receiving a threshold amount of vibration data over a period of time for characterizing different operations performed by the motor 20 over the same period of time.

In some cases, the processor 28 may generate the one or more baseline vibration profiles based on nominal or expected operations (e.g., full load, expected load) of the motor 20. In such cases, the one or more baseline vibration profiles may correspond to an expected operating condition of the motor 20. In some cases, the processor 28 may use the one or more baseline vibration profiles to determine whether faults or other issues are present with the motor 20. That is, the processor 28 may compare received vibration data to the a respective baseline vibration profile and if the vibration data does not correlate to the baseline vibration profile within a threshold percentage, the processor 28 may determine that an anomaly (e.g., a fault condition) is present on the motor 20. Alternatively or additionally, the processor 28 may compare received vibration data to one or more alignment thresholds (e.g., based on a threshold percentage) associated with one or more anomalies to determine that an anomaly is present on the motor 20. In some embodiments, the processor 28 may identify the type of anomaly or issue that is present based on matching the vibration data to anomaly vibration profiles determined during previous anomalies of the motor 20.

With the foregoing in mind, the processor 28 may generate the baseline vibration profiles by synchronizing the time-series and/or frequency domain vibration data with the speed of a rotor/shaft of the motor 20, a position of the rotor/shaft, a rotational direction of the rotor/shaft, an axis of the motor 20, and/or other operations of the motor 20. For example, the processor 28 may associate the frequency response of baseline vibration profiles to the operation characteristic of the motor 20 based on receiving user inputs, using a machine learning process, among other things. In some cases, the processor 28 may store one or more baseline vibration profiles in the memory 26 based on associating a frequency response of the baseline vibration profiles to an operation characteristic of the motor 20.

In one example, the processor 28 may generate a baseline vibration profile for one or more spinning speeds of the shaft of the motor 20 by correlating a frequency response of the acquired vibration data with the one or more spinning speeds of the shaft. In another example, the processor 28 may generate a baseline vibration profile for one or more positions of the rotor/shaft by correlating a frequency response of the acquired vibration data with the one or more positions of the rotor/shaft. It should be appreciated that different vibration profiles may be determined for different operations of the motor 20. As such, the processor 28 may characterize different operations of the motor 20 based on a comparison between subsequently acquired vibration data and the corresponding vibration profiles. In some cases, matching the subsequently received vibration data with the baseline vibration profiles in frequency domain may facilitate efficient anomaly detection of the corresponding operation characteristic of the motor 20.

Furthermore, in some cases, the processor 28 of the integrated drive motor assembly 34 may generate the one or more baseline vibration profiles. For example, the processor 28 may use machine learning to generate the one or more baseline vibration profiles of the vibration data based on receiving a threshold amount (e.g., days, weeks, years) of vibration data (e.g., time-series and/or frequency domain vibration data). For example, the machine learning may include supervised machine learning, semi-supervised machine-learning, and/or unsupervised machine learning. In any case, the processor 28 may use each of the baseline vibration profiles to detect anomalies (e.g., high vibrations) of the motor 20.

In some cases, the processor 28 may detect the anomalies (e.g., faults) during operation of the motor 20 based on detecting deviations of the acquired vibration data from the baseline vibration profile of the motor 20 or based on detecting that the acquired vibration data is aligned (e.g., matches) with the anomaly vibration profile of the motor 20. For example, the processor 28 may detect the anomalies based on matching the acquired vibration data with the anomaly vibration profile of the motor 20 according to an alignment threshold (e.g., within 1% of the anomaly vibration profile, within 2% of the anomaly vibration profile, within 5% of the anomaly vibration profile). Such anomalies may include mechanical failures associated with mechanical components attached to the motor. For example, the mechanical failures may be associated with coupling misalignments, gearbox wears, belt tensions, and/or motor roller bearings wear or misalignment.

At block 86, the processor 28 may receive additional vibration data and/or shock data (e.g., second set of vibration data) from the accelerometer 30 during operation of the motor 20. The processor 28 may receive the additional vibration data after generating the one or more baseline vibration profiles. Moreover, the processor 28 may associate the additional vibration data to one or more operations of the motor 20 based on the vibrations.

At block 88, the processor 28 may compare the additional data to the one or more baseline vibration profiles. For example, the processor 28 may compare the additional vibration data to one or more baseline vibration profiles associated with the operations of the motor 20 causing the vibrations.

At block 90, the processor 28 may determine one or more anomalies based on the comparison. As mentioned above, the processor 28 may determine the one or more anomalies based on deviations between the additional data and the respective baseline vibration profiles. The processor 28 may determine the deviations of the additional data from the respective baseline vibration profiles based on one or more thresholds as described above. The thresholds may be user configurable, pre-set, or determined by the processor 28, user input, machine learning algorithms, or the like.

For example, the processor 28 may determine a table of motor shaft speed versus root mean square value (RMS) of vibration data to determine the one or more anomalies. The processor 28 may then use the table to generate a regression model baseline vibration profile. Accordingly, the processor 28 may use the regression model baseline vibration profile to determine the one or more anomalies based on detecting deviations from the regression model baseline vibration profile. Moreover, the processor 28 may also use the regression model baseline vibration profile to estimate performance metrics of the motor 20 based on receiving additional data associated with measured speed and vibration of the motor 20.

In any case, the processor 28 may determine anomalies based on detecting deviations of the acquired vibration data from the baseline vibration profile of the motor 20 or based on detecting that the acquired vibration data is aligned (e.g., matches) with the anomaly vibration profile of the motor 20.

For example, anomalies may be caused by misalignment of the motor shaft, bearings of the integrated drive motor assembly 34 wearing off, among other things. In some embodiments, the integrated drive motor assembly 34 may provide all the vibration data to the processor 28. In alternative or additional embodiments, the integrated drive motor assembly 34 may provide the indication of anomalies, the vibration data associated with a detected anomaly, or both to the processor 28. Accordingly, the integrated drive motor assembly 34 and/or the processor 28 may use less storage based on storing relevant anomalies (e.g., the indication of anomalies, the vibration data of the detected anomalies).

At block 92, the processor 28 may provide commands (e.g., one or more notifications) in response to determining the one or more anomalies. For example, the processor 28 may halt an operation of the motor 20, may reduce the speed of operation of the motor 20, or may cause performing any other viable countermeasure, in response to receiving an indication of the anomaly in the operation of the motor 20. Moreover, based on the position of the accelerometer 30 on the control circuitry 16 (e.g., in close proximity of the motor 20 and the processor 28), the processor 28 may determine the anomaly with low latency. As such, the processor 28 may cause performing the countermeasure with low latency (e.g., 1 millisecond, 2 millisecond, 5 milliseconds, 10 milliseconds, and so on) to reduce (e.g., minimize, eliminate) possible damages to the motor 20 caused by the anomaly.

As mentioned above, alternatively or additionally, the processor 28 may determine one or more anomalies associated with the motor 20 (e.g., mechanical components of the motor 20) based on user provided vibration and shock thresholds. In some cases, the processor 28 may receive one or more thresholds provided by a user or pre-set during manufacturing to detect the anomalies (e.g., instantaneously detect the anomalies). For example, the processor 28 may detect deviations of the vibration data and/or shock data provided by the accelerometer 30 associated with the motor 20 higher than one or more user provided thresholds or one or more thresholds set during manufacturing.

The present disclosure includes drive modules for drive assemblies of an industrial automation system. The drive modules may provide power and control operations of the motor. The drive modules may include a housing containing the control circuitry and the power circuitry and the housing may be independent of the frame size and/or power of the motor. As such, the housing may be interchangeable for any motor frame size and/or motor power. The drive modules may also include an adapter that may be shaped and/or sized to connect the drive module to the motor. As such, the size and/or shape of the adapter may be based on the frame size and/or power of the motor. Technical effects of the disclosed techniques include providing interchangeable housings for drive modules of drive assemblies and reducing manufacturing cost by using uniform housings for multiple motor frame sizes and/or motor powers.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 62(f). However, for any claims containing elements designated in any other manner, it is intended that such elements are not to be interpreted under 35 U.S.C. 62(f).

The invention claimed is:

1. An integrated drive motor assembly, comprising:
a first housing enclosing a motor;
an adapter component coupled to the first housing;
a second housing coupled to the adapter component, wherein the second housing comprises:
a body portion comprising a cavity that houses:
a power circuit board configured to provide one or more voltages to the motor; and
a control circuit board comprising:
at least one processor configured to control one or more operations of the power circuit board; and
an accelerometer configured to detect a first set of vibration data; and
an end cap configured to enclose the cavity of the body portion at a first side of the body portion via one or more fasteners, wherein the first housing, the second housing, the adapter component, and the end cap are arranged along a rotational axis of the motor; and
a potting material disposed throughout the cavity between the end cap and the adapter component, wherein the potting material surrounds the power circuit board and the control circuit board within the second housing and is bonded to the control circuit board.

2. The integrated drive motor assembly of claim 1, wherein the at least one processor is configured to:
receive the first set of vibration data from the accelerometer during a first period of time;
determine one or more baseline vibration profiles based on the first set of vibration data;
receive a second set of vibration data from the accelerometer during a second period of time, wherein the second period of time is after the first period of time; and
determine whether one or more anomalies are present within the motor based on the second set of vibration data and the one or more baseline vibration profiles.

3. The integrated drive motor assembly of claim 2, wherein each baseline vibration profile of the one or more baseline vibration profiles is associated with an operation characteristic of the motor.

4. The integrated drive motor assembly of claim 3, wherein the operation characteristic comprises a spinning speed of a shaft of the motor, a position of the shaft, a rotational direction of the shaft, or any combination thereof.

5. The integrated drive motor assembly of claim 2, wherein the processor is configured to determine the one or more baseline vibration profiles based on:
determining a frequency response of the first set of vibration data;
associating the frequency response of the first set of vibration data to an operation characteristic of the motor; and
storing the frequency response with the associated operation characteristic of the motor as one of the one or more baseline vibration profiles.

6. The integrated drive motor assembly of claim 2, wherein the processor is configured to determine the one or more anomalies based on:

detecting deviations of the second set of vibration data higher than one or more deviation thresholds based on the one or more baseline vibration profiles; or
detecting that the second set of vibration data are aligned with one or more anomalies conditions of the motor within one or more alignment thresholds based on the one or more baseline vibration profiles.

7. The integrated drive motor assembly of claim 1, wherein the potting material bonded to the control circuit board is configured to reduce one or more vibrations of the control circuit board relative to the first housing.

8. The integrated drive motor assembly of claim 1, wherein the at least one processor is configured to detect one or more deviations of the first set of vibration data greater than one or more deviation thresholds that are set by a user or preset during manufacturing.

9. The integrated drive motor assembly of claim 8, wherein the potting material bonded to the control circuit board is configured to reduce one or more vibrations of the control circuit board relative to the first housing and the adapter component.

10. A method, comprising:
receiving, by a processor of an integrated drive motor assembly, a first set of vibration data of a motor of the integrated drive motor assembly from an accelerometer of the integrated drive motor assembly during a first period of time, wherein the motor is enclosed within a first housing of the integrated drive motor assembly, wherein the accelerometer and the processor are disposed on a control board within a body portion cavity of a second housing of the integrated drive motor assembly, wherein the first housing is coupled to a first side of the second housing via an adapter component and the body portion cavity of the second housing is filled with potting material between the adapter component and an end cap enclosing a second side of the body portion cavity, wherein the potting material is configured to bond the control board to the second housing, and wherein the first housing, the second housing, the adapter component, and the end cap are arranged along a rotational axis of the motor;
generating, by the processor, one or more baseline vibration profiles based on the first set of vibration data;
receiving, by the processor, a second set of vibration data of the motor from the accelerometer during a second period of time after the first period of time;
comparing, by the processor, the second set of vibration data with the one or more baseline vibration profiles; and
determining, by the processor, that one or more anomalies are present in the motor based on the comparison.

11. The method of claim 10, wherein generating the one or more baseline vibration profiles comprises synchronizing the first set of vibration data with at least one operation characteristic of the motor.

12. The method of claim 11, wherein the at least one operation characteristic of the motor comprises spinning speed of a shaft of the motor, a position of the shaft, a rotational direction of the shaft, or any combination thereof.

13. The method of claim 10, wherein generating the one or more baseline vibration profiles comprises characterizing normal operating conditions of the motor, characterizing anomaly conditions of the motor, or both based on the first set of vibration profiles.

14. The method of claim 13, wherein determining the one or more anomalies comprises:

detecting deviations of the second set of vibration data above one or more thresholds from the normal operating conditions of the motor;

detecting that the second set of vibration data are aligned with the anomaly conditions of the motor; or both.

15. The method of claim 10, comprising transmitting, by the processor, one or more notifications representative of the one or more anomalies to a supervisory controller for performing one or more countermeasures.

16. The method of claim 10, wherein generating a baseline vibration profile of the one or more baseline vibration profiles comprises:

determining, by the processor, a frequency response of the first set of vibration data;

associating, by the processor, the frequency response of the first set of vibration data to an operation characteristic of the motor; and storing the frequency response with the associated operation characteristic of the motor as one of the one or more baseline vibration profiles.

17. The method of claim 10, wherein the potting material is configured to reduce one or more vibrations of the accelerometer relative to the vibrations of the motor.

18. A method of manufacturing an integrated drive motor assembly, comprising:

assembling a control circuit in a cavity of a body portion of a first housing of the integrated drive motor assembly, wherein the control circuit comprises a processor and an accelerometer to detect vibrations;

enclosing, using one or more fasteners, a first side of the body portion by an end cap;

potting, using potting material, throughout the cavity of the body portion between the first side of the body portion enclosed by the end cap and a second side of the body portion coupled to an adapter component, wherein the potting material is configured to bond the control circuit with an interior of the cavity of the body portion of the first housing; and coupling the first housing to a second housing of the integrated drive motor assembly via the adapter component, wherein the second housing encloses a motor, wherein the motor is configured to operate to move a load, wherein the first housing, the second housing, the adapter component, and the end cap are arranged along a rotational axis of the motor, wherein the potting material is configured to reduce one or more vibrations of the accelerometer relative to the second housing, and wherein the accelerometer is configured to detect vibrations of the motor based on the potting material reducing one or more vibrations of the accelerometer relative to the second housing.

19. The method of claim 18, wherein assembling the control circuit in the first housing comprises coupling the control circuit and the interior of the first housing of the integrated drive motor assembly using one or more connectors.

20. The method of claim 18, comprising coupling the first housing and the second housing via an adapter, wherein the potting material bonding the control circuit with the interior of the first housing is configured to reduce one or more vibrations of the control circuit relative to the second housing and the adapter.

* * * * *